Patented Sept. 12, 1922.

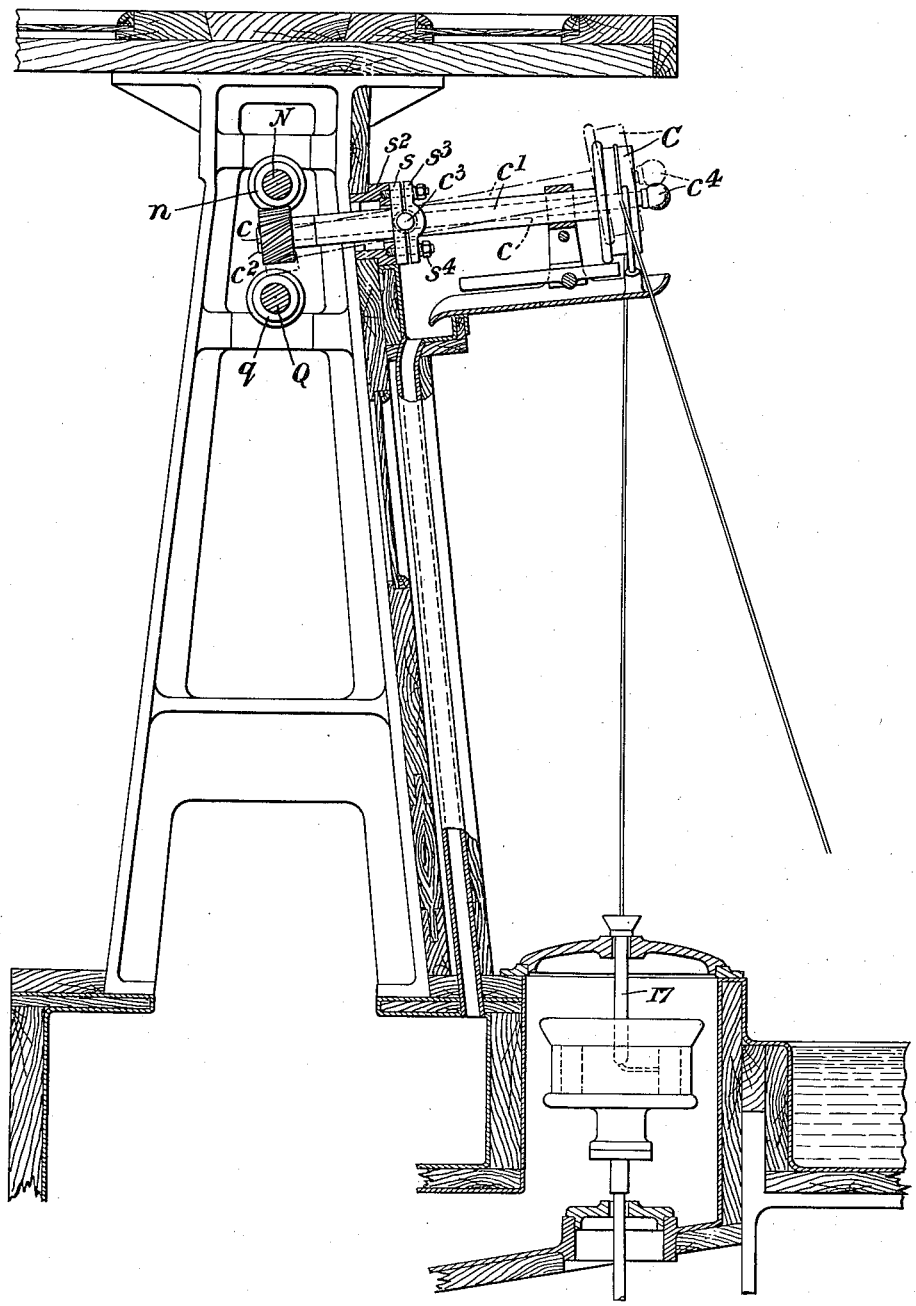

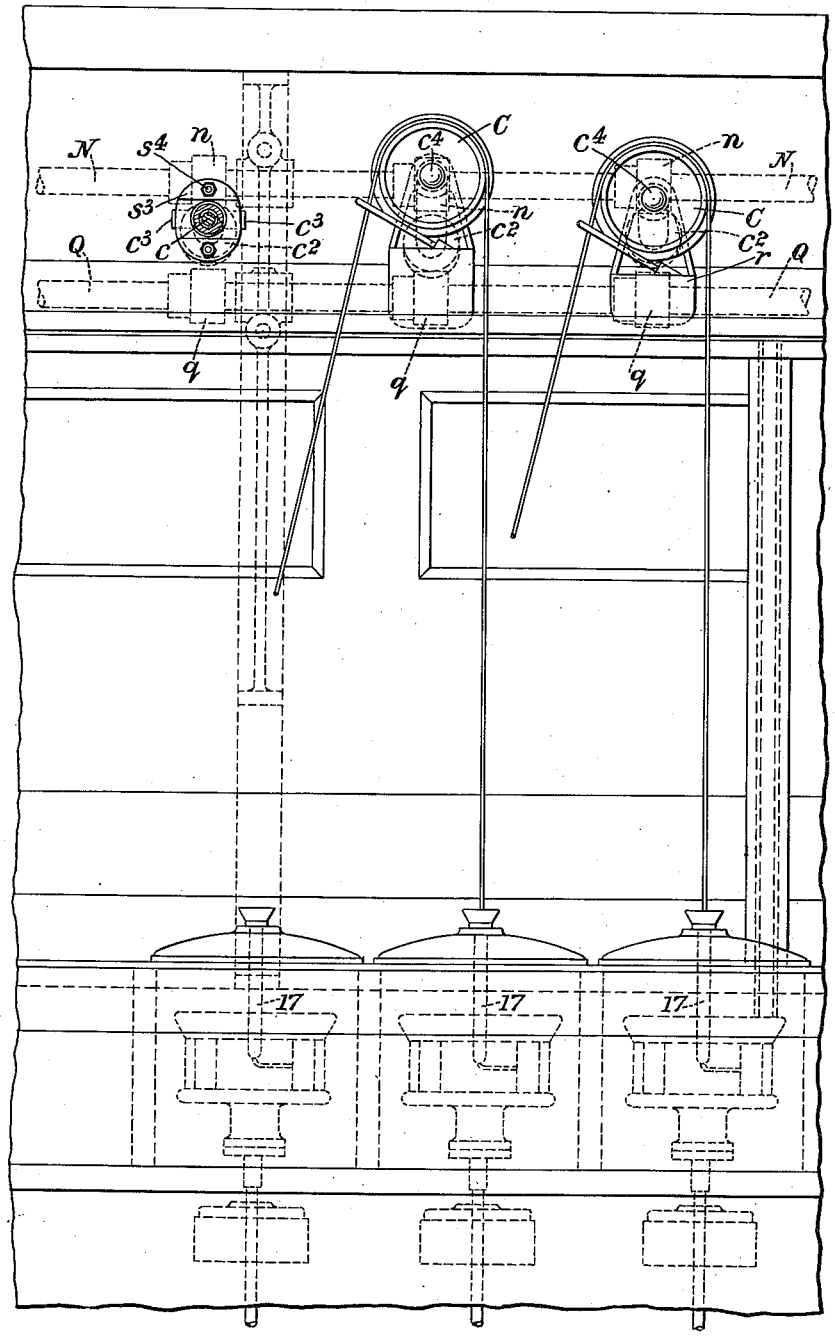

1,429,127

UNITED STATES PATENT OFFICE.

JAMES CLAYTON, OF BABBACOMBE, ENGLAND, ASSIGNOR TO THE VISCOSE COMPANY, OF MARCUS HOOK, PENNSYLVANIA, A CORPORATION OF PENNSYLVANIA.

APPARATUS FOR AND METHOD OF MANUFACTURING ARTIFICIAL SILK.

Application filed November 6, 1919. Serial No. 336,040½.

*To all whom it may concern:*

Be it known that I, JAMES CLAYTON, a subject of the King of Great Britain, lately residing at 12, Middlesborough Road, Coventry, in the county of Warwick, but now residing at Sebakwe, Babbacombe, in the county of Devon, England, have invented a new and useful Improvement in Apparatus for and Methods of Manufacturing Artificial Silk, of which the following is a specification.

In a co-pending application Serial No. 321,992 dated the 5th day of September A. D. 1919 (patented February 7, 1922, No. 1,406,153), I have described and claimed the provision, in machines employed in the manufacture of artificial silk, of drawing-roller guides, or godets, having different circumferential speeds of rotation the slower circumferential speed being used when the threads from the setting baths have to be passed through the thread guides, or funnels. Under the said application I describe, for the purpose of carrying that invention into effect, the provision, in addition to the ordinary drawing-roller guides, or godets, of additional drawing-roller guides, or godets, rotated at a slower circumferential speed than that at which the ordinary drawing-roller guides, or godets, are rotated and I also describe the formation of the drawing-roller guides, or godets, with an additional part of smaller diameter than the part of ordinary diameter.

According to my present invention I attain the same object by employing drawing-roller guides, or godets, of the usual circumference or any required circumference for normal work, and, in combination therewith, I provide means whereby each of the said drawing-roller guides, or godets, can be driven at different speeds according to whether it is in use for normal working, or whether the thread is being passed through the thread guide, or funnel. For this purpose I can employ, for example, skew wheels, or other gear on shafts and means for driving the said shafts at different speeds and means whereby the skew wheels, or the like, on the shafts of the ordinary drawing-roller guides, or godets, can be engaged each with one or other of the skew wheels, or the like, on the said shafts, according to whether the drawing-roller guide, or godet, is to be driven at a high circumferential speed for normal work or at a slower circumferential speed whilst the thread is being passed through the thread guide or funnel.

I will describe, with reference to the accompanying drawings, how my present invention can be carried into practical effect, premising that I do not limit myself to the precise details illustrated.

Figures 1 and 2 are views, at right angles to each other, of part of a machine with ordinary godets provided with means, as aforesaid, in accordance with my invention.

Each ordinary godet C, is so arranged that it can be driven, as aforesaid, at the higher circumferential speed when the thread is passing to the spinning-boxes during the normal working of the machine, and at the lower circumferential speed when the thread is to be passed through the thread-guide, or funnel 17. The sleeve $c^1$ through which the shaft $c$ of the godet passes is provided with trunnions $c^3$ which can turn in bearings $s$ in a block $s^2$ carried by the frame and can be gripped by the cap-piece $s^3$ pressed against the trunnions by tightening up the screw-nuts $s^4$. The scroll wheel $c^2$ on the shaft $c$ can be engaged with the corresponding scroll wheel $n$ on a quickly rotating shaft N for ordinary work, or the said scroll wheel $c^2$ can, by tilting the shaft, sleeve and godet, by means of the knob $c^4$ be engaged with the scroll wheel $q$ on the slowly rotating shaft Q when the thread has to be passed through the thread-guide, or funnel 17 and be afterwards reengaged with the scroll wheel $n$ for normal work.

I do not limit myself to any particular relative speeds, but I may mention that satisfactory results are obtainable if the gearing be arranged so that the godets are driven at a circumferential velocity of 125 feet per minute for threading purposes and at a velocity of 250 feet per minute for ordinary work.

What I claim is:—

1. In apparatus for spinning artificial silk, a rotary spinning device, a setting bath for the artificial silk, a feed roller for drawing the silk from the setting bath and feeding it to the rotary spinning device, and means for driving said feed roller at relatively low speed to facilitate the introduction of the free end of the silk to the spinning device and thereafter at relatively high speed during the normal spinning operation.

2. In apparatus for spinning artificial silk, a rotary spinning device, a setting bath for the artificial silk, a feed roller for drawing the silk from the setting bath and feeding it to the spinning device, a high speed driving shaft, a low speed driving shaft, and means for bringing said drawing and feed roller into operative connection with said low speed shaft to afford a low speed feed of the thread on the introduction of the latter to the spinning device, and with said high speed shaft to afford a high speed feed during the normal spinning operation.

3. The method of spinning artificial silk which consists in drawing the silk at predetermined speed from a setting bath to facilitate the delivery of the free end of the silk to a rotary spinning device and, after said delivery has been accomplished drawing and feeding the silk at increased speed during the normal spinning operation.

In testimony whereof I have signed my name to this specification in the presence of two subscribing witnesses.

JAMES CLAYTON.

Witnesses:
G. Z. LYNN,
EDW'D. GEO. DAVIES.